United States Patent
Sakai

(10) Patent No.: US 10,763,504 B2
(45) Date of Patent: Sep. 1, 2020

(54) TRANSITION METAL-CONTAINING HYDROXIDE, AND METHOD FOR PRODUCING LITHIUM-CONTAINING COMPOSITE OXIDE

(71) Applicant: ASAHI GLASS COMPANY, LIMITED, Tokyo (JP)

(72) Inventor: Tomohiro Sakai, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/074,079

(22) PCT Filed: Feb. 3, 2017

(86) PCT No.: PCT/JP2017/004001
§ 371 (c)(1),
(2) Date: Jul. 30, 2018

(87) PCT Pub. No.: WO2017/135415
PCT Pub. Date: Aug. 10, 2017

(65) Prior Publication Data
US 2019/0044139 A1    Feb. 7, 2019

(30) Foreign Application Priority Data

Feb. 3, 2016   (JP) .............................. 2016-019043

(51) Int. Cl.
*H01M 4/525*      (2010.01)
*C01G 53/00*      (2006.01)
(Continued)

(52) U.S. Cl.
CPC ............ *H01M 4/525* (2013.01); *C01G 53/00* (2013.01); *C01G 53/006* (2013.01); *C01G 53/40* (2013.01);
(Continued)

(58) Field of Classification Search
CPC ................. H01M 4/525; H01M 4/505; H01M 2004/021; C01G 53/00; C01G 53/40;
(Continued)

(56) References Cited

U.S. PATENT DOCUMENTS

2007/0009798 A1   1/2007  Inagaki et al.
2009/0170000 A1   7/2009  Coowar
(Continued)

FOREIGN PATENT DOCUMENTS

EP    2 555 287 A1    2/2013
JP    2013-075826 A   4/2013
(Continued)

OTHER PUBLICATIONS

Search Report issued in corresponding International Patent Application No. PCT/JP2017/004001, dated Mar. 7, 2017.
(Continued)

*Primary Examiner* — William D Young
(74) *Attorney, Agent, or Firm* — McDermott Will & Emery LLP

(57) ABSTRACT

To provide a transition metal-containing hydroxide, which is a precursor of a lithium-containing composite oxide, with which it is possible to obtain a lithium ion secondary battery excellent in the discharge capacity and cycle characteristics, by using as a cathode active material a lithium-containing composite oxide obtained from the hydroxide. A transition metal-containing hydroxide, which is a precursor of a lithium-containing composite oxide, wherein in a distribution of the logarithmic derivative pore specific surface area relative to the pore size, obtained by BJH method, the proportion of the sum of the logarithmic derivative pore specific surface areas with pore sizes of 10 nm or larger, to 100% of the sum of the logarithmic derivative pore specific surface areas in the entire distribution, is at least 23%.

6 Claims, 3 Drawing Sheets

(51) Int. Cl.
  *H01M 4/505* (2010.01)
  *H01M 4/02* (2006.01)
(52) U.S. Cl.
  CPC ............ *C01G 53/44* (2013.01); *C01G 53/50* (2013.01); *H01M 4/505* (2013.01); *C01P 2002/60* (2013.01); *C01P 2002/72* (2013.01); *C01P 2002/74* (2013.01); *C01P 2002/76* (2013.01); *C01P 2004/51* (2013.01); *C01P 2004/61* (2013.01); *C01P 2006/12* (2013.01); *C01P 2006/16* (2013.01); *C01P 2006/17* (2013.01); *C01P 2006/40* (2013.01); *H01M 2004/021* (2013.01)

(56) References Cited

U.S. PATENT DOCUMENTS

| | | | |
|---|---|---|---|
| 2010/0196761 A1* | 8/2010 | Tatsumi | C01G 51/04 429/223 |
| 2015/0034865 A1 | 2/2015 | Park et al. | |
| 2016/0301065 A1 | 10/2016 | Sakai | |
| 2016/0372749 A1 | 12/2016 | Iida et al. | |

FOREIGN PATENT DOCUMENTS

| | | | |
|---|---|---|---|
| JP | 2014-116161 A | | 6/2014 |
| JP | 2015-517186 A | | 6/2015 |
| JP | 2016-017017 A | | 2/2016 |
| JP | 2016017017 A | * | 2/2016 |
| JP | 2016-199414 A | | 12/2016 |
| WO | 2007/091076 A1 | | 8/2007 |
| WO | 2015/005180 A1 | | 1/2015 |

OTHER PUBLICATIONS

Notification of Transmittal of Translation of the International Preliminary Report on Patentability dated Aug. 16, 2018 in corresponding International Application No. PCT/JP2017/004001 (7 pages).
Extended European Search Report issued in corresponding European Patent Application No. 17747566.2-1106, dated Oct. 11, 2019.

* cited by examiner

TRANSITION METAL-CONTAINING HYDROXIDE, AND METHOD FOR PRODUCING LITHIUM-CONTAINING COMPOSITE OXIDE

CROSS REFERENCE

This application is the U.S. National Phase under 35 U.S.C. § 371 of International Application No. PCT/JP2017/004001, filed on Feb. 3, 2017, which claims the benefit of Japanese Application No. 2016-019043, filed on Feb. 3, 2016, the entire contents of each are hereby incorporated by reference.

TECHNICAL FIELD

The present invention relates to a transition-metal containing hydroxide which is a precursor of a lithium-containing composite oxide, and a method for producing a lithium-containing composite oxide.

BACKGROUND ART

As a cathode active material contained in a positive electrode of a lithium ion secondary battery, a lithium-containing composite oxide, particularly $LiCoO_2$, is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

As a cathode active material which may be able to further increase the discharge capacity of a lithium ion secondary battery, a cathode active material having high Li and Mn contents i.e. a so-called lithium rich cathode active material has attracted attention. However, a lithium ion secondary battery using such a lithium rich cathode active material has a problem such that the characteristics to maintain the charge and discharge capacity at the time of repeating a charge and discharge cycle (hereinafter referred to as the cycle characteristics) tend to decrease.

As a lithium rich cathode active material, the following (1) has been proposed.

(1) A cathode active material, which is obtained by mixing a transition metal precursor containing a composite transition metal-compound represented by $Mn_aM_b(OH_{1-x})_2$, wherein M is at least two selected from the group consisting of Ni, Co, Mn, Al, Cu, Fe, Mg, B, Cr and second series transition metals, $0.4 \leq a \leq 1$, $0 \leq b \leq 0.6$, $a+b \leq 1$, and $0 < x < 0.5$, and a saccharide, with a lithium precursor, and firing the mixture in an oxidizing atmosphere (Patent Document 1).

Patent Document 1 discloses that by using the above-obtained lithium rich cathode active material, it is possible to obtain a lithium ion secondary battery excellent in the rate characteristics, life properties and charge and discharge efficiency.

PRIOR ART DOCUMENT

Patent Document

Patent Document 1: JP-A-2015-517186

DISCLOSURE OF INVENTION

Technical Problem

However, according to studies by the present inventor, a lithium ion secondary battery using a cathode active material obtained by firing a mixture of a transition metal precursor containing a saccharide with a lithium precursor in an oxidizing atmosphere, has a problem of low discharge capacity.

It is an object of the present invention to provide a transition metal-containing hydroxide, which is a precursor of a lithium-containing composite oxide and with which it is possible to obtain a lithium ion secondary battery excellent in the discharge capacity and cycle characteristics, by using as a cathode active material a lithium-containing composite oxide obtained by using the hydroxide; and a method for producing a lithium-containing composite oxide with which it is possible to obtain a lithium ion secondary battery excellent in the discharge capacity and cycle characteristics.

Solution to Problem

The present invention provides the following embodiments.

<1> A transition metal-containing hydroxide, which is a precursor of a lithium-containing composite oxide, wherein in a distribution of the logarithmic derivative pore specific surface area relative to the pore size, obtained by BJH method, the proportion of the sum of the logarithmic derivative pore specific surface areas with pore sizes of 10 nm or larger, to 100% of the sum of the logarithmic derivative pore specific surface areas in the entire distribution, is at least 23%.

<2> The transition metal-containing hydroxide according to <1>, wherein in a distribution of the logarithmic derivative pore specific surface area relative to the pore size, obtained by BJH method, the sum of the logarithmic derivative pore specific surface areas with pore sizes of 10 nm or larger, is at least 300 $m^2/g$.

<3> The transition metal-containing hydroxide according to <1> or <2>, which is a transition metal-containing hydroxide represented by the following formula (1):

$$Ni_\alpha Co_\beta Mn_\gamma M_\delta (OH)_2 \qquad \text{formula (1)}$$

wherein M is a metal element other than Li, Ni, Co and Mn, α is from 0.15 to 0.5, β is from 0 to 0.2, γ is from 0.3 to 0.8, δ is from 0 to 0.1, and α+β+γ+δ=1.

<4> The transition metal-containing hydroxide according to any one of <1> to <3>, wherein $D_{50}$ of the transition metal-containing hydroxide is from 3.5 to 15.5 μm.

<5> A method for producing a lithium-containing composite oxide, which comprises a step of mixing the transition metal-containing hydroxide as defined in any one of <1> to <4> and a lithium compound, and firing the mixture at 900° C. or higher.

Advantageous Effects of Invention

According to the transition metal-containing hydroxide of the present invention, it is possible to obtain a lithium ion secondary battery excellent in the discharge capacity and cycle characteristics, by using as a cathode active material a lithium-containing composite oxide obtained by using the hydroxide. According to the method for producing a lithium-containing composite oxide of the present invention, it is possible to produce a lithium-containing composite oxide with which a lithium ion secondary battery excellent in the discharge capacity and cycle characteristics can be obtained.

DESCRIPTION OF EMBODIMENTS

Figure 1:
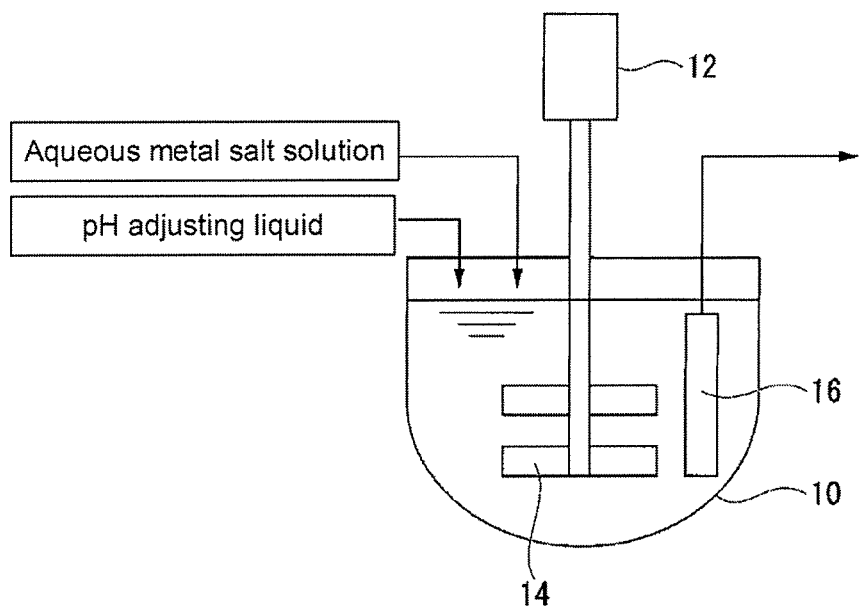
FIG. 1 is a diagram schematically illustrating an example of an apparatus for producing a transition metal-containing hydroxide by a concentration method.

The following definitions of terms are applied to this specification including Claims.

The "BJH method" is a method to determine the mesopore size distribution by Barrett, Joyner and Halenda, which is one of methods to determine the pore size distribution from an adsorption isotherm. In the measurement of the adsorption isotherm, nitrogen gas is used as an adsorption gas. Further, in the measurement of the adsorption isotherm of a transition metal-containing hydroxide, a hydroxide dried under conditions as described in Examples is used.

The "logarithmic derivative pore specific surface area" is dA/d log(D) which is a value obtained by dividing the differential pore surface area dA which is an increase of the pore surface area A between measurement points (in a pore size interval) by the common logarithmic difference d log (D) between the upper value and the lower value of the pore size D in the interval.

The "distribution of the logarithmic derivative pore specific surface area relative to the pore size" is a distribution obtained by plotting the logarithmic derivative pore specific surface area dA/d log(D) between the respective measurement points (in a pore size interval) relative to the average value of the pore sizes D in each interval.

The "distribution of the logarithmic derivative pore specific surface area relative to the pore size, obtained by BJH method" is obtained by measuring an adsorption isotherm using a commercial specific surface area/pore size distribution measuring apparatus, followed by calculation using an analysis software attached to the apparatus from the obtained adsorption isotherm.

The "BET specific surface area" is a specific surface area measured by a BET (Brunauer, Emmet, Teller) method from an adsorption isotherm. In the measurement of the adsorption isotherm, nitrogen gas is used as an adsorption gas. Further, in the measurement of the adsorption isotherm of a transition metal-containing hydroxide, a hydroxide dried under conditions as described in Examples is used.

The "$D_{50}$" is a particle size at a point of 50% on an accumulative volume distribution curve which is drawn by obtaining the particle size distribution on the volume basis and taking the whole to be 100%, that is, a volume-based accumulative 50% size.

The "particle size distribution" is obtained from the frequency distribution and accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "crystallite size" is obtained by the following Scherrer equation from a diffraction angle 2θ (deg) and half-value width B (rad) of a peak of specific (abc) plane in an X-ray diffraction pattern.

$$D_{abc}=(0.9\lambda)/(B\cos\theta)$$

wherein $D_{abc}$ is a crystallite size of (abc) plane, and λ is the wavelength of X-rays.

The "crystallite size distribution" is one obtained by analyzing a specific peak in an X-ray diffraction pattern by using crystallite size distribution analysis software CSDA, manufactured by Rigaku Corporation. The explanation of analysis mechanism is described in the user manual of the crystallite size distribution analysis software CSDA, manufactured by Rigaku Corporation, and the detail of the analysis mechanism is described in the following reference documents mentioned in the manual.
(1) Takashi Ida, Annual Report of the Ceramic Research Laboratory Nagoya Institute of Technology, Vol. 6, p. 1 (2006).
(2) T. Ida, S. Shimazaki, H. Hibino and H. Toraya, J. Appl. Cryst., 36, 1107 (2003).
(3) T. Ida and K. Kimura, J. Appl. Cryst., 32, 982 (1999).
(4) T. Ida and K. Kimura, J. Appl. Cryst., 32, 634 (1999).
(5) T. Ida, Rev. Sci. Instrum., 69, 2268 (1998).
(6) International Tables for Crystallography Volume C Second Edition, Edited by A. J. C. Wilson and E. Prince, Kluwer Academic Publishers, Netherlands (1999).
(7) X-Rays in Theory Experiment Second Edition, A. H. Compton and S. K. Allison, D. Van. Norstrand Company, New York (1936).

The "logarithmic standard deviation of crystallite size distribution" is a value obtained from the crystallite size distribution (number distribution) by means of the crystallite size distribution analysis software CSDA, manufactured by Rigaku Corporation.

The "hydroxide" includes a hydroxide and an oxyhydroxide in which a hydroxide is partially oxided. That is, a compound represented by $Me(OH)_2$ (wherein Me is a metal element other than Li) includes $Me(OH)_2$, MeOOH and a mixture thereof.

The expression "Li" means a Li element, not a Li metal simple substance, unless otherwise specified. The same applies to expressions of other elements such as Ni, Co, Mn, etc.

The composition analysis of a transition metal-containing hydroxide and a lithium-containing composite oxide is carried out by inductively-coupled plasma spectrometry (hereinafter referred to as ICP). Further, the ratio of elements in a lithium-containing composite oxide is a value with respect to the lithium-containing composite oxide before initial charging (also called an activation treatment).

<Transition Metal-Containing Hydroxide>

The transition metal-containing hydroxide of the present invention (hereinafter sometimes referred to as the present hydroxide) is suitably used as a precursor of a lithium-containing composite oxide. The present hydroxide preferably contains Ni and Mn as essential elements, whereby the obtainable lithium ion secondary battery will be more excellent in the discharge voltage and the discharge capacity. The present hydroxide may further contain Co, whereby the obtainable lithium ion secondary battery will be more excellent in the rate characteristics. The present hydroxide may contain, as the case requires, a metal element other than Li, Ni, Co and Mn.

Figure 2:
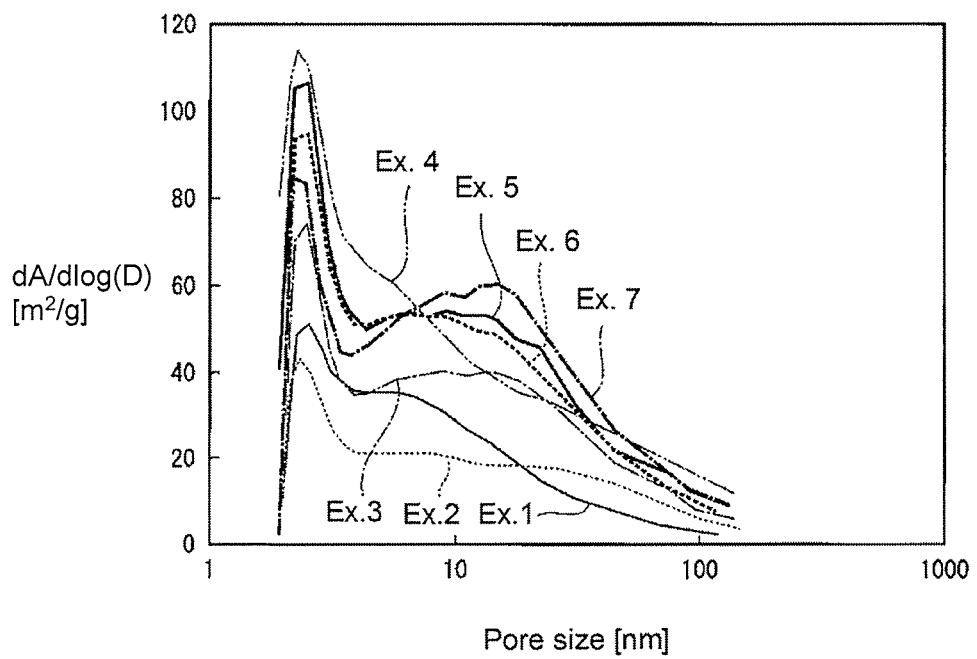
FIG. 2 is a graph illustrating the distribution of the logarithmic derivative pore specific surface area dA/d log (D) relative to the pore size of the transition metal-containing hydroxide in each of Ex. 1 to 7.

Of the present hydroxide, in the distribution of the logarithmic derivative pore specific surface area $dA/d\log(D)$ relative to the pore size D, obtained by BJH method, as shown in FIG. 2 for example, the proportion of the sum of the logarithmic derivative pore specific surface areas with pore sizes of 10 nm or larger (hereinafter sometimes referred to as $\{dA/d\log(D)\}_{D\geq 10\ nm}$), to 100% of the sum of the logarithmic derivative pore specific surface areas in the entire distribution (hereinafter sometimes referred to as $\{dA/d\log(D)\}_{total}$) (hereinafter the proportion will sometimes be referred to as $\{dA/d\log(D)\}_{D\geq 10\ nm}/\{dA/d\log(D)\}_{total}$) is at least 23%. The proportion is preferably at least 24%, more preferably at least 25%.

When $\{dA/d\log(D)\}_{D\geq 10\ nm}/\{dA/d\log(D)\}_{total}$ of the present hydroxide is at least 23%, by using a lithium-containing composite oxide obtained from the present hydroxide as a cathode active material, it is possible to obtain a lithium ion secondary battery excellent in the discharge capacity and cycle characteristics. Further, when $\{dA/d\log(D)\}_{D\geq 10\ nm}/\{dA/d\log(D)\}_{total}$ is at least 24% or at least 25%, by using a lithium-containing composite oxide obtained from the present hydroxide as a cathode active material, it is possible to obtain a lithium ion secondary battery more excellent in the discharge capacity and cycle characteristics.

The upper limit of $\{dA/d\log(D)\}_{D\geq 10\ nm}/\{dA/d\log(D)\}_{total}$ of the present hydroxide is not particularly limited, and is ideally 100%.

$\{dA/d\log(D)\}_{D\geq 10\ nm}$ of the present hydroxide is, in view of more excellent initial discharge capacity of the obtainable lithium ion secondary battery, preferably at least 300 m²/g, more preferably at least 305 m²/g, still more preferably at least 315 m²/g.

$\{dA/d\log(D)\}_{D\geq 10\ nm}$ of the present hydroxide is, in view of more excellent cycle characteristics of the obtainable lithium ion secondary battery, preferably at most 500 m²/g, more preferably at most 450 m²/g, still more preferably at most 400 m²/g.

The present hydroxide is preferably a hydroxide represented by the following formula (I).

$$Ni_\alpha Co_\beta Mn_\gamma M_\delta (OH)_2 \qquad \text{formula (1)}$$

wherein M is a metal element other than Li, Ni, Co and Mn, α is from 0.15 to 0.5, β is from 0 to 0.2, γ is from 0.3 to 0.8, δ is from 0 to 0.1, and α+β+γ+δ=1.

α is the molar ratio of Ni contained in the present hydroxide. When α is within the above range, the obtainable lithium ion secondary battery will be more excellent in the discharge capacity and the discharge voltage. α is preferably from 0.2 to 0.4.

β is the molar ratio of Co contained in the present hydroxide. When β is within the above range, the obtainable lithium ion secondary battery will be more excellent in the discharge capacity and the discharge voltage. β is preferably from 0 to 0.09.

γ is the molar ratio of Mn contained in the present hydroxide. When γ is within the above range and the above-described Li/Me ratio is at least 1.1, a lithium rich cathode active material will be obtained. γ is preferably from 0.45 to 0.8, whereby the obtainable lithium ion secondary battery will be more excellent in the discharge capacity and the discharge voltage.

The present hydroxide may contain other metal element M as the case requires. Such other metal element M is, in view of more excellent discharge capacity of the obtainable lithium ion secondary battery, preferably at least one member selected from the group consisting of Na, Mg, Ti, Zr, Al, W and Mo, and with a view to easily suppressing a decrease of the discharge voltage of the lithium ion secondary battery by repeatedly carrying out a charge and discharge cycle, more preferably at least one member selected from the group consisting of Ti, Zr and Al.

δ is the molar ratio of M contained in the present hydroxide. δ is preferably from 0 to 0.08.

Of the present hydroxide, $D_{50}$ is preferably from 3.5 to 15.5 μm. $D_{50}$ is more preferably from 3.5 to 14 μm. When $D_{50}$ of the hydroxide is within the above range, the lithium ion secondary battery will be more excellent in the discharge capacity.

Of the present hydroxide, the BET specific surface area is preferably from 10 to 200 m²/g. The BET specific surface area is more preferably from 20 to 100 m²/g. When the specific surface area of the present hydroxide is at least the lower limit value of the above range, the obtainable lithium ion secondary battery will be more excellent in the discharge capacity. When the specific surface area of the present hydroxide is at most the upper limit value of the above range, the obtainable lithium ion secondary battery will be more excellent in the cycle characteristics.

Of the above-described present hydroxide, $\{dA/d\log(D)\}_{D\geq 10\ nm}/\{dA/d\log(D)\}_{total}$ is at least 23%, and accordingly it is considered that a lithium ion secondary battery excellent in the discharge capacity and cycle characteristics can be obtained, by using a lithium-containing composite oxide obtained from the present hydroxide as a cathode active material, from the following reasons.

It has been known that the BET specific surface area of the lithium-containing composite oxide should be increased so as to increase the discharge capacity of the lithium ion secondary battery.

In order to improve the cycle characteristics of the lithium ion secondary battery, the homogeneity of the crystal structure of the lithium-containing composite oxide should be increased. As a method for increasing the homogeneity of the crystal structure of the lithium-containing composite oxide, the present inventor has found to increase the temperature at which a mixture of a hydroxide and a lithium compound is fired.

However, if the temperature at which the mixture is fired is increased when a lithium-containing composite oxide is obtained, the BET specific surface area of the obtainable lithium-containing composite oxide may become small.

Whereas of the present hydroxide, $\{dA/d\log(D)\}_{D\geq 10\ nm}/\{dA/d\log(D)\}_{total}$ is at least 23%, that is, relatively large pores are present in a relatively large amount. Accordingly, it is considered that even when the mixture of the present hydroxide and a lithium compound is fired at a high temperature, an appropriate pore structure will be formed in the interior of secondary particles of the lithium-containing composite oxide. As a result, the BET specific surface area can be made large while the homogeneity of the crystal structure of the lithium-containing composite oxide is increased, whereby the discharge capacity and the cycle characteristics of the lithium ion secondary battery can be made high.

<Method for Producing Transition Metal-Containing Hydroxide>

The present hydroxide can be produced, for example, by the following method (I) or method (II). As a method for producing the present hydroxide, the method (II) is preferred, whereby the present hydroxide of which $\{dA/d \log(D)\}_{D \geq 10\ nm}/\{dA/d \log(D)\}_{total}$ is high can readily be produced.

Method (I):

In an alkali coprecipitation method in which at least a nickel salt, a manganese salt and an alkali metal hydroxide are mixed in a state of an aqueous solution, whereby a hydroxide is precipitated, the reaction temperature, the reaction time, the pH of the mixed liquid and the amount of a complexing agent are adjusted.

Method (II):

In an alkali coprecipitation method in which at least a nickel salt, a manganese salt and an alkali metal hydroxide are mixed in a state of an aqueous solution, whereby a hydroxide is precipitated, the reaction temperature, the reaction time, the pH of the mixed liquid and the amount of a complexing agent are adjusted, and further, a water-soluble organic matter (excluding sugars) in a state of an aqueous solution is mixed at the same time.

(Method (I))

The method (I) is a method in which conditions (the reaction temperature, the reaction time, the pH of the mixed liquid and the amount of a complexing agent) in an alkali coprecipitation method are adjusted so that $\{dA/d \log(D)\}_{D \geq 10\ nm}/\{dA/d \log(D)\}_{total}$ of the hydroxide will be at least 23%.

The alkali coprecipitation method is preferably a method in which an aqueous metal salt solution and a pH adjusting liquid containing an alkali metal hydroxide are continuously supplied to a reactor and mixed, and while the pH of the mixed liquid is kept constant, a hydroxide is precipitated.

The metal salt may, for example, be a nitrate, an acetate, a chloride or a sulfate of each transition metal element, and a sulfate is preferred, since the material cost is relatively low, and excellent battery characteristics are thereby obtainable.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The ratio of Ni, Co, Mn and M in the aqueous metal salt solution is adjusted to be the same as the ratio of Ni, Co and Mn to be contained in the hydroxide.

The total concentration of Ni, Co, Mn and M in the aqueous metal salt solution is preferably from 0.1 to 3 mol/kg, more preferably from 0.5 to 2.5 mol/kg. When the total concentration of Ni, Co, Mn and M is at least the above lower limit value, the productivity will be excellent. When the total concentration of Ni, Co, Mn and M is at most the above upper limit value, the metal salts can be sufficiently dissolved in water.

The pH adjusting liquid is preferably an aqueous solution containing an alkali metal hydroxide.

The alkali metal hydroxide may be suitably sodium hydroxide or potassium hydroxide.

The pH of the mixed liquid is preferably from 10 to 12, more preferably from 10.5 to 11.5. When the pH of the mixed liquid is at least the lower limit value of the above range, $\{dA/d \log(D)\}_{D \geq 10\ nm}/\{dA/d \log(D)\}_{total}$ of the present hydroxide will easily be made at least 23%. When the pH of the mixed liquid is at most the upper limit value of the above range, $D_{50}$ and the specific surface area of the hydroxide can be made within desired ranges.

During mixing of the aqueous metal salt solution and the pH adjusting liquid, it is preferred to keep the pH in the reactor to be a pH set within the above range, so that the coprecipitation reaction will appropriately proceed.

In the mixed liquid, a complexing agent may be added so as to adjust the solubility of Ni, Co, Mn and M ions. The complexing agent may be an aqueous ammonia solution or an aqueous ammonium sulfate solution.

The ratio of the molar amount of ammonia or ammonium ions to the total molar amount (Me) of Ni, Co, Mn and M ($NH_3/Me$ or $NH_4^+/Me$) is preferably from 0.01 to 0.3, more preferably from 0.01 to 0.1. When $NH_3/Me$ or $NH_4^+/Me$ is at least the lower limit value of the above range, $\{dA/d \log(D)\}_{D \geq 10\ nm}/\{dA/d \log(D)\}_{total}$ of the hydroxide will easily be made at least 23%. When $NH_3/Me$ or $NH_4^+/Me$ is at most the upper limit value of the above range, $D_{50}$ and the specific surface area of the hydroxide will be made within desired ranges.

The temperature (reaction temperature) of the mixed liquid during mixing of the aqueous metal salt solution and the pH adjusting liquid is preferably from 20 to 80° C., more preferably from 25 to 60° C. When the reaction temperature is at least the lower limit value of the above range, the reaction will sufficiently be promoted. When the reaction temperature is at most the upper limit value of the above range, $\{dA/d \log(D)\}_{D \geq 10\ nm}/\{dA/d \log(D)\}_{total}$ of the hydroxide will easily be made at least 23%.

The mixing time (reaction time) of the aqueous metal salt solution and the pH adjusting liquid is preferably from 1 to 48 hours, more preferably from 3 to 30 hours. When the reaction time is at least the lower limit value of the above range, the reaction will sufficiently proceed. When the reaction time is at most the upper limit value of the above range, $\{dA/d \log(D)\}_{D \geq 10\ nm}/\{dA/d \log(D)\}_{total}$ of the hydroxide will easily be made at least 23%.

The aqueous metal salt solution and the pH adjusting liquid are preferably mixed while being stirred by an agitating blade 14 attached to a stirring device 12 in a reactor 10, as shown in FIG. 1.

The stirring device may, for example, be a three-one motor, and the agitating blade may, for example, be anchor-type, propeller-type or paddle-type.

Mixing of the aqueous metal salt solution and the pH adjusting liquid is preferably conducted in an inert atmosphere, such as in a nitrogen atmosphere or in an argon atmosphere, with a view to preventing oxidation of the hydroxide. It is particularly preferably conducted in a nitrogen atmosphere from the viewpoint of production costs.

As the method for precipitating a hydroxide, two types may be mentioned, i.e. a method (hereinafter referred to as a concentration method) of carrying out the precipitation reaction while concentrating the hydroxide by withdrawing the mixed liquid in the reactor 10 through a filter 16 (e.g. a filter cloth), as shown in FIG. 1, and a method (hereinafter referred to as an overflow method) of carrying out the precipitation reaction while maintaining the concentration of the hydroxide to be low by withdrawing the mixed liquid in the reactor, together with the hydroxide, without using a filter. The concentration method is preferred, with a view to making the particle size distribution narrow.

The obtained hydroxide is preferably washed to remove impurity ions. When impurity ions remain, the impurity will be present on the surface and in the crystals of the cathode active material obtained by firing, thus leading to adverse effects on the battery characteristics.

The washing method may, for example, be a method of repeating pressure filtration and dispersion into distilled water. Such washing, when conducted, is preferably repeated until the electrical conductivity of the filtrate or the supernatant at the time when the hydroxide is dispersed in distilled water, becomes to be at most 50 mS/m, more preferably at most 20 mS/m.

Further, after the washing of the hydroxide, the hydroxide is preferably dried as the case requires.

The temperature for drying the hydroxide is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the hydroxide.

The drying time may be properly set depending upon the amount of the hydroxide and is preferably from 1 to 300 hours, more preferably from 5 to 120 hours.

(Method (II))

The method (II) is a method in which in an alkali coprecipitation method, at least a nickel salt, a manganese salt, an alkali metal hydroxide and a water-soluble organic matter (excluding sugars) are mixed in a state of an aqueous solution, so that $\{dA/d\ \log(D)\}_{D \geq 10\ nm}/\{dA/d\ \log(D)\}_{total}$ of the hydroxide will be at least 23%.

The alkali coprecipitation method may be carried out in the same manner as in the method (I), and the preferred conditions are the same as in the method (I).

The water-soluble organic matter is preferably a linear compound, whereby the specific surface area of the hydroxide tends to be large, and the pores are easily formed. The water-soluble organic matter is preferably a nonionic compound, whereby the crystal growth will not be impaired. The nonionic water-soluble organic matter may, for example, be an alcohol or an ether.

The alcohol may, for example, be methanol, ethanol, 1-propanol, 2-propanol, ethylene glycol, propylene glycol, diethylene glycol, dipropylene glycol, polyethylene glycol, butanediol or glycerin.

The water-soluble organic matter is particularly preferably polyethylene glycol in view of low volatility.

The ratio of the mass of the water-soluble organic matter to the mass of the hydroxide (water-soluble organic matter/hydroxide) is preferably from 0.001 to 0.08, more preferably from 0.001 to 0.05. When the water-soluble organic matter/Me is at least the lower limit value of the above range, $\{dA/d\ \log(D)\}_{D \geq 10\ nm}/\{dA/d\ \log(D)\}_{total}$ of the hydroxide will be made sufficiently high. When the water-soluble organic matter/Me is at most the upper limit value of the above range, a uniform product will be obtained.

The water-soluble organic matter may be preliminarily dissolved in either one or both of the aqueous metal salt solution and the pH adjusting liquid, or an aqueous solution of the water-soluble organic matter may be prepared separately from the aqueous metal salt solution and the pH adjusting liquid, which is supplied to the reactor.

In the above-described method (II), at least a nickel salt, a manganese salt, an alkali metal hydroxide and a water-soluble organic matter (excluding sugars) are mixed in a state of an aqueous solution, whereby a transition metal-containing hydroxide is precipitated, and accordingly, the water-soluble organic matter is present between among primary particles, whereby in the obtainable hydroxide, relatively large pores are present in a relatively large amount. Accordingly, it is possible to produce the present hydroxide of which $\{dA/d\ \log(D)\}_{D \geq 10\ nm}/\{dA/d\ \log(D)\}_{total}$ is at least 23%, that is, the present hydroxide with which it is possible to obtain a lithium ion secondary battery excellent in the discharge capacity and cycle characteristics, by using as a cathode active material, a lithium-containing composite oxide obtained from the present hydroxide.

<Method for Producing Lithium-Containing Composite Oxide>

The method for producing a lithium-containing composite oxide of the present invention (hereinafter referred to as the present production method) comprises a step of mixing the present hydroxide and a lithium compound and firing the mixture at 900° C. or higher.

The lithium compound is preferably at least one member selected from the group consisting of lithium carbonate, lithium hydroxide and lithium nitrate. In view of handling efficiency in the production step, lithium carbonate is more preferred.

The ratio of the molar amount of Li contained in the lithium compound to the total molar amount (Me) of Ni, Co, Mn and M contained in the present hydroxide (Li/Me) is preferably from 1.1 to 1.7, more preferably from 1.2 to 1.7, still more preferably from 1.3 to 1.7. The Li/Me ratio is a factor which determines the composition of the lithium-containing composite oxide. That is, the Li/Me ratio is properly determined within the above range depending upon the composition of the lithium-containing composite oxide desired.

The method of mixing the present hydroxide and the lithium compound may, for example, be a method of using e.g. a rocking mixer, a nauta mixer, a spiral mixer, a cutter mill or a V mixer.

The temperature (firing temperature) at which the mixture is fired is at least 900° C., preferably at least 950° C., more preferably at least 980° C. The firing temperature is preferably at most 1,100° C., more preferably at most 1,050° C. When the firing temperature is at least the lower limit value of the above range, it is possible to produce a lithium-containing composite oxide with which a lithium ion secondary battery excellent in the cycle characteristics can be obtained. When the firing temperature is at most the upper limit value of the above range, volatilization of Li can be suppressed during the firing step, and a lithium-containing composite oxide having a Li/Me ratio close to that at the time of mixing will be obtained.

The firing apparatus may, for example, be an electric furnace, a continuous firing furnace or a rotary kiln.

During the firing, since the hydroxide should be oxidized, the firing is preferably conducted in the atmospheric air, and it is particularly preferably conducted while air is supplied.

The supply rate of air is preferably from 10 to 200 mL/min., more preferably from 40 to 150 mL/min., per 1 L of the inner volume of the furnace of the firing apparatus. By supplying air during the firing, the metal element contained in the hydroxide will be sufficiently oxidized.

The firing time is preferably from 4 to 40 hours, more preferably from 4 to 20 hours.

The firing may be one-stage firing or two-stage firing i.e. temporary firing followed by main firing at 900° C. or higher. The two-stage firing is preferred since Li thereby tends to be readily uniformly dispersed in the lithium-containing composite oxide. In the case of conducting two-stage firing, main firing is carried out at a temperature within the above firing temperature range. And, the temperature for the temporary firing is preferably from 400 to 700° C., more preferably from 500 to 650° C.

According to the above-described present production method, in which the present hydroxide of which $\{dA/d\ \log(D)\}_{D\geq 10\ nm}/\{dA/d\ \log(D)\}_{total}$ is at least 23% and the lithium compound are mixed and the mixture is fired at 900° C. or higher, it is possible to produce a lithium-containing composite oxide with which a lithium ion secondary battery excellent in the discharge capacity and cycle characteristics can be obtained.

<Lithium-Containing Composite Oxide>

The lithium-containing composite oxide obtainable by the present production method (hereinafter sometimes referred to as the present composite oxide) is preferably a solid solution of $Li(Li_{1/3}Mn_{2/3})O_2$ (lithium excess phase) having a layered rock salt crystal structure with space group C2/m and $LiM'O_2$ (wherein M' contains Ni and Mn as essential elements and optionally contains Co or other metal element M) having a layered rock salt crystal structure with space group R-3m. The present composite oxide having such a crystal structure is confirmed by X-ray diffraction measurement.

Typically, in an X-ray diffraction measurement, a peak of (020) plane assigned to space group C2/m appears at 2θ=20 to 22 deg. Further, in an X-ray diffraction measurement, a peak of peak of (003) plane assigned to space group R-3m appears at 2θ=18 to 20 deg, and a peak of (110) plane assigned to space group R-3m appears at 2θ=64 to 66 deg.

The present composite oxide is more preferably a composite oxide represented by the following formula (2).

$$Li_xNi_\alpha Co_\beta Mn_\gamma M_\delta O_y \qquad \text{formula (2)}$$

wherein M is a metal element other than Li, Ni, Co and Mn, x is from 1.1 to 1.7, α is from 0.15 to 0.5, β is from 0 to 0.2, γ is from 0.3 to 0.8, δ is from 0 to 0.1, α+β+γ+δ=1, and y is the number of moles of oxygen (O) necessary to satisfy the valencies of Li, Ni, Co, Mn and M.

x is the molar ratio of Li contained in the present composite oxide. When x is within the above range, the obtainable lithium ion secondary battery will be more excellent in discharge capacity. x is more preferably from 1.2 to 1.7.

The ranges of α, β, γ and δ are the same as the ranges for the formula (1), and the preferred ranges are also the same.

M is the same as M in the formula (1), and the preferred embodiment is also the same.

Of the present composite oxide, the logarithmic standard deviation of the crystallite size distribution obtained from the peak of (003) plane assigned to a crystal structure with space group R-3m in an X-ray diffraction pattern is preferably at most 0.198, more preferably at most 0.185, still more preferably at most 0.180. The lower limit value of the logarithmic standard deviation of the crystallite size distribution is preferably 0.040.

In the present composite oxide of solid solution type, the logarithmic standard deviation of the crystallite size distribution of a peak of (003) plane assigned to a crystal structure with space group R-3m being at most the above upper limit value means a narrow crystallite size distribution. By using the present composite oxide having a narrow crystallite size distribution as a cathode active material, in a charge and discharge reaction of the obtainable lithium ion secondary battery, non-uniform reaction decreases, and the cycle characteristics of the lithium ion secondary battery will improve.

In an X-ray diffraction pattern of the present composite oxide, the ratio of the integrated intensity ($I_{020}$) of a peak of (020) plane assigned to a crystal structure with space group C2/m to the integrated intensity ($I_{003}$) of a peak of (003) plane assigned to a crystal structure with space group R-3m ($I_{020}/I_{003}$) is preferably from 0.02 to 0.3, more preferably from 0.02 to 0.28, still more preferably from 0.02 to 0.25. When $I_{020}/I_{003}$ is within the above range, the present composite oxide has the above two crystal structures in a well balanced manner, whereby the discharge capacity of the obtainable lithium ion secondary battery will easily be made high.

In a crystallite having a layered rock salt crystal structure with space group R-3m, during charging and discharging, each Li diffuses in the a-b axis direction in the same layer, and getting in and out of Li occurs at ends of the crystallite. The c-axis direction of the crystallite is the lamination direction, and in a shape being long in the c-axis, the number of ends where Li can get in and out, increases as compared with other crystallites having the same volume. The crystallite size in the a-b axis direction is a crystallite size ($D_{110}$) obtained by the Scheller equation from a peak of (110) plane assigned to a crystal structure with space group R-3m in the X-ray diffraction pattern of the present composite oxide. The crystallite size in the c-axis direction is a crystallite size ($D_{003}$) obtained by the Scheller equation from a peak of (003) plane of space group R-3m in the X-ray diffraction pattern of the present composite oxide.

In the present composite oxide, $D_{003}$ is preferably from 60 to 140 nm, more preferably from 70 to 120 nm, still more preferably from 80 to 115 nm. When $D_{003}$ is at least the lower limit value of the above range, the cycle characteristics of the lithium ion secondary battery can easily be made good. When $D_{003}$ is at most the upper limit value of the above range, the discharge capacity of the lithium ion secondary battery can easily be made high.

In the present composite oxide, Duo is preferably from 30 to 80 nm, more preferably from 35 to 75 nm, still more preferably from 40 to 70 nm. When $D_{110}$ is at least the lower limit value of the above range, the stability of the crystal structure will be improved. When $D_{003}$ is at most the upper limit value of the above range, the cycle characteristics of the lithium ion secondary battery can easily be made good.

<Cathode Active Material>

The cathode active material of the present invention (hereinafter sometimes referred to as "the present cathode active material") may be the present composite oxide itself or may be the present composite oxide having a surface treatment applied thereto.

The surface treatment is a treatment to coat a surface of the present composite oxide with a material (surface-coating material) having a different composition from the material constituting the present composite oxide. The surface-coating material may, for example, be an oxide (such as aluminum oxide, silicon oxide, titanium oxide, zirconium oxide, magnesium oxide, calcium oxide, boron oxide, antimony oxide or bismuth oxide), a sulfate (such as sodium sulfate, potassium sulfate, magnesium sulfate, calcium sulfate or aluminum sulfate) or a carbonate (such as calcium carbonate or magnesium carbonate).

The mass of the surface-coating material is preferably at least 0.01 mass %, more preferably at least 0.05 mass %, particularly preferably at least 0.1 mass %, to the mass of the present composite oxide. The mass of the surface-coating material is preferably at most 10 mass %, more preferably at most 5 mass %, particularly preferably at most 3 mass %, to the mass of the present composite oxide. When the surface-coating material is present on the surface of the present composite oxide, the oxidation reaction of a non-aqueous electrolytic solution on the surface of the present composite oxide can be prevented, whereby the life span of a battery can be improved.

In a case where the present composite oxide is subjected to a surface treatment, the surface treatment may be carried out by spraying a predetermined amount of a liquid (coating liquid) containing the surface-coating material to the present composite oxide, followed by firing to remove the solvent in the coating liquid, or may be carried out by dipping the present composite oxide in the coating liquid, followed by carrying out solid-liquid separation by filtration and firing to remove the solvent.

The present cathode active material is preferably secondary particles in which a plurality of primary particles are coaggregated.

$D_{50}$ of the secondary particles of the present cathode active material is preferably from 3 to 15 μm, more preferably from 3 to 12 μm, still more preferably from 3.5 to 10 μm. When $D_{50}$ of the present cathode active material is within the above range, the discharge capacity of the lithium ion secondary battery can easily be made high.

The BET specific surface area of the present cathode active material is preferably from 0.5 to 5 $m^2/g$, more preferably from 1 to 5 $m^2/g$, still more preferably from 2 to 4 $m^2/g$. When the BET specific surface area of the present cathode active material is at least the lower limit value of the above range, the discharge capacity of the lithium ion secondary battery can be easily made high. When the BET specific surface area of the present cathode active material is at most the upper limit value of the above range, the cycle characteristics of the lithium ion secondary battery can be easily made good.

<Positive Electrode for Lithium Ion Secondary Battery>

The positive electrode for a lithium ion secondary battery in the present invention (hereinafter referred to as the present positive electrode) contains the present cathode active material. Specifically, the positive electrode comprises a cathode active material layer containing the present cathode active material, an electrically conductive material and a binder, formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present cathode active material, the electrically conductive material and the binder are dissolved or dispersed in a medium to obtain a slurry. The obtained slurry is applied to the positive electrode current collector, and the medium is removed e.g. by drying to form a cathode active material layer. As the case requires, the cathode active material layer may be pressed e.g. by roll pressing. The present positive electrode is obtained in such a manner.

Otherwise, the present cathode active material, the electrically conductive material and the binder are kneaded with a medium to obtain a kneaded product. The obtained kneaded product is pressed on the positive electrode current collector to obtain the present positive electrode.

<Lithium Ion Secondary Battery>

The lithium ion secondary battery in the present invention (hereinafter referred to as the present battery) has the present positive electrode. Specifically, it comprises the present positive electrode, a negative electrode and a non-aqueous electrolyte.

(Negative Electrode)

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si. As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used. As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

(Non-Aqueous Electrolyte)

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the inorganic solid electrolyte, a material having lithium ion conductivity may be used.

The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

EXAMPLES

Now, the present invention will be described in detail with reference to Examples, but it should be understood that the present invention is by no means thereby restricted.

Ex. 2, 3 and 5 to 7 are Examples of the present invention, and Ex. 1 and 4 are Comparative Examples.

($D_{50}$ of Hydroxide and Cathode Active Material)

The hydroxide or the cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and cumulative volume distribution curve, whereby the volume-based particle size distribution was obtained. From the obtained cumulative volume distribution curve, $D_{50}$ was obtained.

(Adsorption Isotherm of Hydroxide)

As a measurement apparatus, a specific surface area/pore size distribution measuring apparatus (manufactured by Shimadzu Corporation, ASAP2020) was used.

0.5 g of a hydroxide was put in a sample cell for measurement, by using a degassing port of the measurement apparatus, temperature raising and evacuation of air were carried out at 10° C./min at 1 mmHg/min (133.3 Pa/min) to 90° C. and 500 μHg (66.7 Pa), and such a state was kept for 60 minutes. Temperature raising was carried out at 3° C./min to 105° C. and the state was kept for 8 hours, followed by purging with nitrogen gas.

The sample cell was attached to an analysis port of the measurement apparatus, and using nitrogen gas at the temperature of liquid nitrogen (77K), an adsorption isotherm on the adsorption side was measured within a relative pressure ($P/P_0$, $P_0$=about 100 kPa) of from 0.01 to 0.995.

(BET Specific Surface Area of Hydroxide)

Using an analysis software attached to a specific surface area/pore size distribution measuring apparatus (manufactured by Shimadzu Corporation, ASAP2020), the BET specific surface area was calculated by means of BET method from 10 points on the adsorption isotherm within a relative pressure $P/P_0$ range of from 0.06 to 0.3.

(Logarithmic Derivative Pore Specific Surface Area of Hydroxide)

Using an analysis software attached to a specific surface area/pore size distribution measuring apparatus (manufactured by Shimadzu Corporation, ASAP2020), the logarithmic derivative pore specific surface area dA/d log(D) was calculated by means of BJH method from 26 points on the adsorption isotherm within a relative pressure $P/P_0$ range of from 0.14 to 0.995, and a distribution of the logarithmic derivative pore specific surface area dA/d log(D) relative to the pore size D was obtained. From the distribution, the sum of the logarithmic derivative pore specific surface areas dA/d log(D) in the entire distribution, $\{dA/d\ log(D)\}_{total}$, and the sum of the logarithmic derivative pore specific surface areas dA/d log(D) with pore sizes of 10 nm or larger, $\{dA/d\ log(D)\}_{D \geq 10\ nm}$, were calculated.

(BET Specific Surface Area of Cathode Active Material)

The BET specific surface area of the cathode active material was calculated by nitrogen adsorption BET method using a specific surface area measuring apparatus (HM model-1208, manufactured by Mountech Co., Ltd.). Degassing was carried out at 200° C. for 20 minutes.

(Composition Analysis)

Composition analyses of the hydroxide and the lithium-containing composite oxide were carried out by a plasma emission spectroscope (SPS3100H manufactured by SII NanoTechnology Inc.). From the ratio of the molar amounts of Li, Ni, Co and Mn obtained from the composition analyses, $\alpha$, $\mu$, $\gamma$ and x in the formulae (1) and (2) were calculated.

(X-Ray Diffraction)

The X-ray diffraction of the lithium-containing composite oxide was measured by means of an X-ray diffraction apparatus (manufactured by Rigaku Corporation, apparatus name: SmartLab). The measurement conditions are shown in Table 1. The measurement was carried out at 25° C. Before the measurement, 1 g of the lithium-containing composite oxide and 30 mg of standard sample 640 d for X-ray diffraction were mixed in an agate mortar, and this mixture was used as the sample for the measurement.

With respect to the X-ray diffraction pattern obtained, peak search was carried out by using integrated X-ray powder diffraction software PDXL2 manufactured by Rigaku Corporation. From the respective peaks, $D_{003}$, $D_{110}$ and $I_{020}/I_{003}$ were obtained.

TABLE 1

| Apparatus condition | Measurement apparatus | SmartLab manufactured by Rigaku Corporation |
|---|---|---|
| | Target | Cu |
| | Detector | D/teX Ultra HE manufactured by Rigaku Corporation |
| | Detector baseline | 44 div |
| | Detector window | 8 div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 70 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, χ threshold: 1.50 |
| | Background removal | Fitting |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

Further, in an X-ray diffraction pattern of the lithium-containing composite oxide, a profile (2θ=17.002 to 20.2 deg) of a peak of (003) plane assigned to a crystal structure with space group R-3m as illustrated in FIG. 1 was analyzed by using crystallite size distribution analysis software CSDA (Ver. 1.3) manufactured by Rigaku Corporation with the following configuration, and the crystallite size distribution was obtained.

[Instrument Parameters]
Goniometer Radius: 300,
Axial Divergence: 5,
Equatorial Divergence: 0.3333333.
[Sample Parameters]
Sample Width: 20,
Sample Thickness: 0.5,
Linear Abs. Coef.: 20.

The logarithmic standard deviation of the crystallite size distribution was obtained from the crystallite size distribution (number distribution) by the crystallite size distribution analysis software CSDA (Ver. 1.3) manufactured by Rigaku Corporation. The logarithmic standard deviation of the crystallite size distribution of the lithium-containing composite oxide is an index of the cycle characteristics of the lithium secondary battery. When the logarithmic standard deviation of the crystallite size distribution of the lithium-containing composite oxide is at most 0.198, the cycle characteristics of the lithium secondary battery tend to be favorable.

(Production of Positive Electrode Sheet)

The cathode active material obtained in each Ex., electrically conductive carbon black as an electrically conductive material, and polyvinylidene fluoride as a binder were weighed in a mass ratio of 88:6:6, and they were added to N-methylpyrrolidone to prepare a slurry.

The slurry was applied on one side of an aluminum foil as a positive electrode current collector having a thickness of 20 μm by means of a doctor blade. The gap of the doctor blade was adjusted so that the thickness of the sheet after roll pressing would be 20 μm. After drying at 120° C., roll pressing was carried out twice to prepare a positive electrode sheet.

(Production of Lithium Ion Secondary Battery)

The positive electrode sheet was punched out into a circle having a diameter of 18 mm, which was used as a positive electrode.

A lithium foil was used as a negative electrode material, and the lithium foil was punched out into a circle having a diameter of 19 mm, which was used as a negative electrode.

As a separator, a porous polypropylene having a thickness of 25 μm was used.

As an electrolytic solution, a liquid having $LiPF_6$ dissolved at a concentration of 1 mol/dm$^3$ in a solvent mixture of ethylene carbonate and diethyl carbonate in a volume ratio of 3:7, was used.

Using the positive electrode, the negative electrode, the separator and the electrolytic solution, a flange type lithium secondary battery was assembled in a glove box in an argon atmosphere.

(Activation Treatment)

With respect to the lithium secondary battery using the cathode active material in each Ex., constant current charging to 4.8 V with a load current of 26 mA per 1 g of the cathode active material was carried out, and then constant current discharging to 2 V with a load current of 26 mA per 1 g of the cathode active material was carried out, as an activation treatment. The discharge capacity on that occasion was taken as the initial discharge capacity.

(1C Discharge Capacity)

With respect to the lithium secondary battery subjected to the activation treatment, constant current/constant voltage charging was carried out totally for 1.5 hours to 4.5 V with a load current of 200 mA per 1 g of the cathode active material, and then constant current discharging was carried out to 2 V with a load current of 200 mA per 1 g of the cathode active material, whereby the 1C discharge capacity was measured.

(Ex. 1)

Nickel(II) sulfate hexahydrate and manganese(II) sulfate pentahydrate were dissolved in distilled water so that the ratio of molar amounts of Ni and Mn would be as shown in Table 2 and the total amount of the sulfates would be 1.5 mol/kg to obtain an aqueous sulfate solution.

As a pH adjusting liquid, sodium hydroxide was dissolved in distilled water so that the concentration would be 1.5 mol/kg to obtain an aqueous sodium hydroxide solution.

As a complexing agent, ammonium sulfate was dissolved in distilled water so that the concentration would be 1.5 mol/kg to obtain an aqueous ammonium sulfate solution.

Into a 2 L baffle-equipped glass reactor, distilled water was put and heated to 50° C. by a mantle heater. While stirring the liquid in the reactor by a paddle type agitating blade, the aqueous sulfate solution was added at a rate of 5.0 g/min and the aqueous ammonium sulfate solution was added at a rate of 0.5 g/min, for 12 hours, and the pH adjusting liquid was added to keep the pH of the mixed liquid to be 10.5, to precipitate a hydroxide containing Ni and Mn. During the addition of the raw material solutions, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m or lower, and the hydroxide was dried at 120° C. for 15 hours.

The hydroxide and lithium carbonate were mixed so that the ratio of the molar amount of Li to the total molar amount (Me) of Ni and Mn (Li/Me) would be as identified in Table 3, to obtain a mixture.

In an electric furnace, while supplying air, the mixture was subjected to temporary firing at 600° C. in air over a period of 3 hours to obtain a temporarily fired product.

In an electric furnace, while supplying air, the temporarily fired product was subjected to main firing at 990° C. in air over a period of 16 hours to obtain a lithium-containing composite oxide. This lithium-containing composite oxide was used as a cathode active material. The results of the measurements and the evaluations are shown in Tables 3 and 4.

(Ex. 2 and 3)

Lithium-containing composite oxides in Ex. 2 and 3 were obtained in the same manner as in Ex. 1 except that the conditions were changed as shown in Tables 2 and 3. The lithium-containing composite oxides were used as cathode active materials. The results of the measurements and the evaluations are shown in Tables 3 and 4.

(Ex. 4)

As a water-soluble organic matter (sugar), sucrose (manufactured by KANTO CHEMICAL CO., INC., reagent) was prepared.

In the same manner as in Ex. 1 except that sucrose was added to the aqueous sulfate solution so that the ratio of the mass of sucrose to the mass of the obtainable hydroxide (sucrose/hydroxide) would be 0.076 and that the conditions were as identified in Tables 2 and 3, a lithium-containing composite oxide in Ex. 4 was obtained. The lithium-containing composite oxide was used as a cathode active material. The results of the measurements and the evaluations are shown in Tables 3 and 4.

(Ex. 5)

In the same manner as in Ex. 4 except that instead of sucrose, as a water-soluble organic matter (excluding sugars), polyethylene glycol (manufactured by KANTO CHEMICAL CO., INC., PEG #6000) was added so that the ratio of the mass of polyethylene glycol to the mass of the obtainable hydroxide (polyethylene glycol/hydroxide) would be 0.05, a lithium-containing composite oxide in Ex. 5 was obtained. The lithium-containing composite oxide was used as a cathode active material. The results of the measurements and the evaluations are shown in Tables 3 and 4.

(Ex. 6)

In the same manner as in Ex. 4 except that instead of sucrose, as a water-soluble organic matter (excluding sugars), polyethylene glycol (manufactured by KANTO CHEMICAL CO., INC., PEG #20000) was added so that the ratio of the mass of polyethylene glycol to the mass of the obtainable hydroxide (polyethylene glycol/hydroxide) would be 0.05, a lithium-containing composite oxide in Ex. 6 was obtained. The lithium-containing composite oxide was used as a cathode active material. The results of the measurements and the evaluations are shown in Tables 3 and 4.

(Ex. 7)

In the same manner as in Ex. 4 except that instead of sucrose, as a water-soluble organic matter (excluding sugars), polyethylene glycol (manufactured by KANTO CHEMICAL CO., INC., PEG #200) was added so that the ratio of the mass of polyethylene glycol to the mass of the obtainable hydroxide (polyethylene glycol/hydroxide) would be 0.05, a lithium-containing composite oxide in Ex. 7 was obtained. The lithium-containing composite oxide was used as a cathode active material. The results of the measurements and the evaluations are shown in Tables 3 and 4.

TABLE 2

| | | Charge [mol %] | | Supply of aqueous sulfate | Charge of complexing agent | Water-soluble | Initial | Controlled | Reaction | Reaction temperature |
|---|---|---|---|---|---|---|---|---|---|---|
| Ex. | Reactor | Ni | Mn | solution [g/min] | $NH_4^+$/Me | organic matter | pH | pH | time [hr] | [° C.] |
| 1 | 2L | 25.0 | 75.0 | 5 | 0.1 | — | 10.5 | 10.5 | 12 | 50 |
| 2 | 2L | 25.0 | 75.0 | 5 | 0.1 | — | 10.5 | 10.5 | 5 | 50 |
| 3 | 30L | 25.0 | 75.0 | 75 | 0.1 | — | 11 | 11 | 5 | 50 |
| 4 | 2L | 25.0 | 75.0 | 5 | 0.1 | Sucrose | 11 | 11 | 5 | 50 |
| 5 | 2L | 25.0 | 75.0 | 5 | 0.1 | PEG#6000 | 11 | 11 | 5 | 50 |
| 6 | 2L | 25.0 | 75.0 | 5 | 0.1 | PEG#20000 | 11 | 11 | 5 | 50 |
| 7 | 2L | 25.0 | 75.0 | 5 | 0.1 | PEG#200 | 11 | 11 | 5 | 50 |

TABLE 3

| | Hydroxide | | | | | | Production of lithium-containing composite oxide | | | |
|---|---|---|---|---|---|---|---|---|---|---|
| | Composition analysis (formula (1)) | | $D_{50}$ | BET specific surface area | $\{dA/dlog(D)\}_{D \geq 10\ nm}$ | $\{dA/dlog(D)\}_{D \geq 10\ nm}/$ $\{dA/dlog(D)\}_{total}$ | Charge Li/Me | Temporary firing | | Main firing | |
| Ex. | α | γ | [μm] | [m²/g] | [m²/g] | | | [° C.] | [hr] | [° C.] | [hr] |
| 1 | 0.251 | 0.749 | 6.5 | 36.3 | 134.3 | 19.8% | 1.58 | 600 | 3 | 990 | 16 |
| 2 | 0.250 | 0.750 | 5.2 | 33.3 | 139.9 | 25.6% | 1.58 | 600 | 3 | 990 | 16 |
| 3 | 0.249 | 0.751 | 3.1 | 55.7 | 298.4 | 46.5% | 1.58 | 600 | 3 | 990 | 16 |
| 4 | 0.250 | 0.750 | 8.0 | 81.1 | 295.2 | 20.2% | 1.58 | 600 | 3 | 990 | 16 |
| 5 | 0.248 | 0.752 | 5.1 | 75.8 | 346.5 | 26.1% | 1.58 | 600 | 3 | 990 | 16 |
| 6 | 0.250 | 0.750 | 13.7 | 70.6 | 317.6 | 26.2% | 1.58 | 600 | 3 | 990 | 16 |
| 7 | 0.248 | 0.752 | 3.6 | 73.0 | 392.7 | 33.7% | 1.58 | 600 | 3 | 990 | 16 |

TABLE 4

| | Lithium-containing composite oxide | | | | | | | Cathode active material | | Lithium secondary battery | |
|---|---|---|---|---|---|---|---|---|---|---|---|
| | Composition analysis (formula (2)) | | | $D_{003}$ | $D_{110}$ | | Logarithmic standard deviation of crystallite size distribution | $D_{50}$ | BET specific surface area | Initial discharge capacity | 1 C discharge capacity |
| Ex. | x | α | γ | [nm] | [nm] | $I_{020}/I_{003}$ | | [μm] | [m²/g] | [mAh/g] | [mAh/g] |
| 1 | 1.54 | 0.25 | 0.75 | 102.4 | 54.1 | 0.040 | 0.082 | 6.2 | 1.76 | 248.8 | 196.4 |
| 2 | 1.54 | 0.25 | 0.75 | 90.6 | 59.0 | 0.044 | 0.131 | 5.0 | 2.29 | 259.9 | 204.6 |
| 3 | 1.58 | 0.25 | 0.75 | 89.0 | 60.1 | 0.044 | 0.169 | 3.3 | 2.87 | 263.0 | 202.9 |
| 4 | 1.58 | 0.25 | 0.75 | 95.1 | 65.6 | 0.045 | 0.140 | 8.2 | 2.49 | 251.2 | 198.4 |
| 5 | 1.54 | 0.25 | 0.75 | 78.7 | 67.0 | 0.049 | 0.104 | 4.5 | 3.48 | 271.5 | 204.6 |
| 6 | 1.56 | 0.25 | 0.75 | 90.5 | 66.3 | 0.043 | 0.189 | 12.0 | 3.15 | 264.2 | 200.0 |
| 7 | 1.56 | 0.25 | 0.75 | 85.7 | 65.8 | 0.043 | 0.134 | 3.2 | 3.10 | 267.7 | 208.5 |

In all of Ex. 1 to 7, firing was conducted at high temperature at a main firing temperature of 990° C. Accordingly, of the lithium-containing composite oxide obtained in each of Ex., the logarithmic standard deviation of the crystallite size distribution obtained from a peak of (003) plane assigned to a crystal structure with R-3m was small. This is considered to indicate high homogeneity of the crystal structure of the lithium-containing composite oxide in each Ex.

Figure 3:
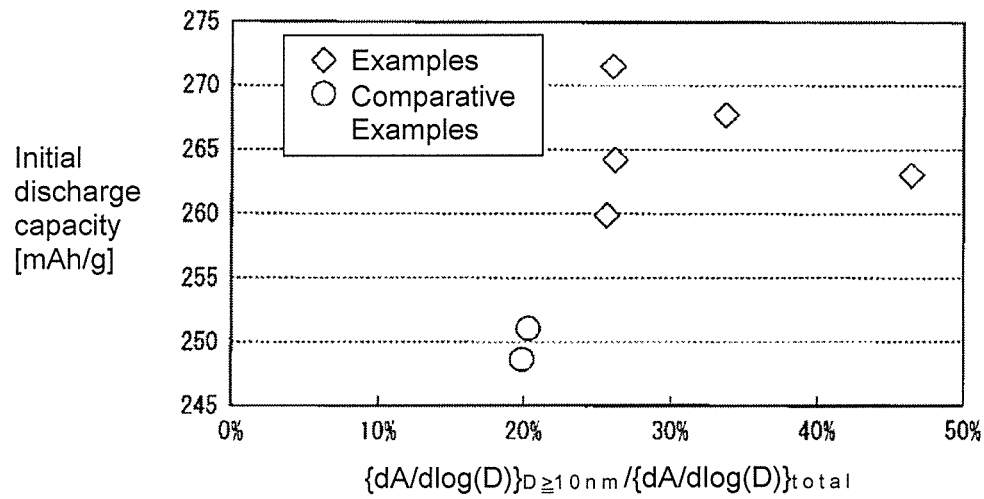
FIG. 3 is a graph illustrating the relation between $\{dA/d\ log(D)\}_{D\geq 10\ nm}/\{dA/d\ log(D)\}_{total}$ of the transition metal-containing hydroxide in each of Ex. 1 to 7, and the initial discharge capacity of the lithium secondary battery.

The relation between $\{dA/d\ log(D)\}_{D \geq 10\ nm}/\{dA/d\ log(D)\}_{total}$ of the hydroxide and the initial discharge capacity of the lithium secondary battery is shown in FIG. 3.

Figure 4:
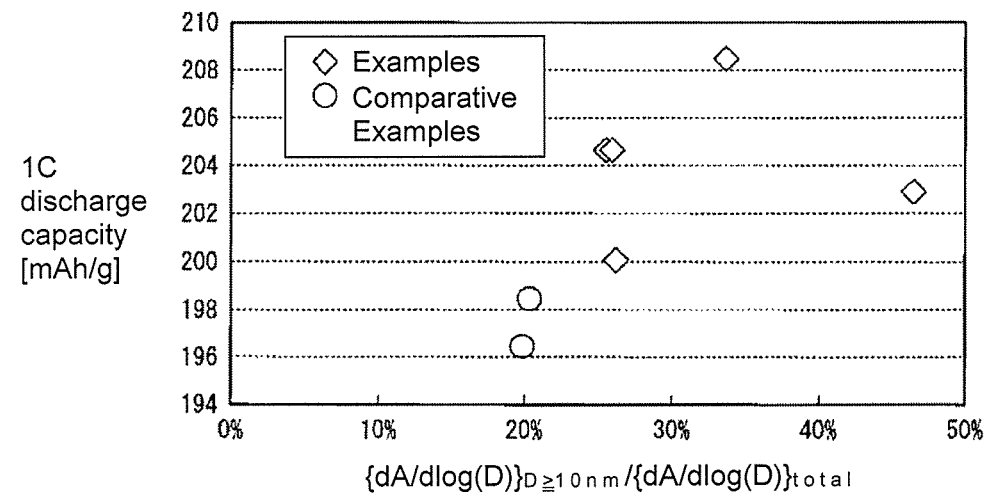
FIG. 4 is a graph illustrating the relation between $\{dA/d\ log(D)\}_{D\geq 10\ nm}/\{dA/d\ log(D)\}_{total}$ of the transition metal-containing hydroxide in each of Ex. 1 to 7 and the 1C discharge capacity of the lithium secondary battery.

The relation between $\{dA/d\ log(D)\}_{D \geq 10\ nm}/\{dA/d\ log(D)\}_{total}$ of the hydroxide and the 1C discharge capacity of the lithium secondary battery is shown in FIG. 4.

Figure 5:
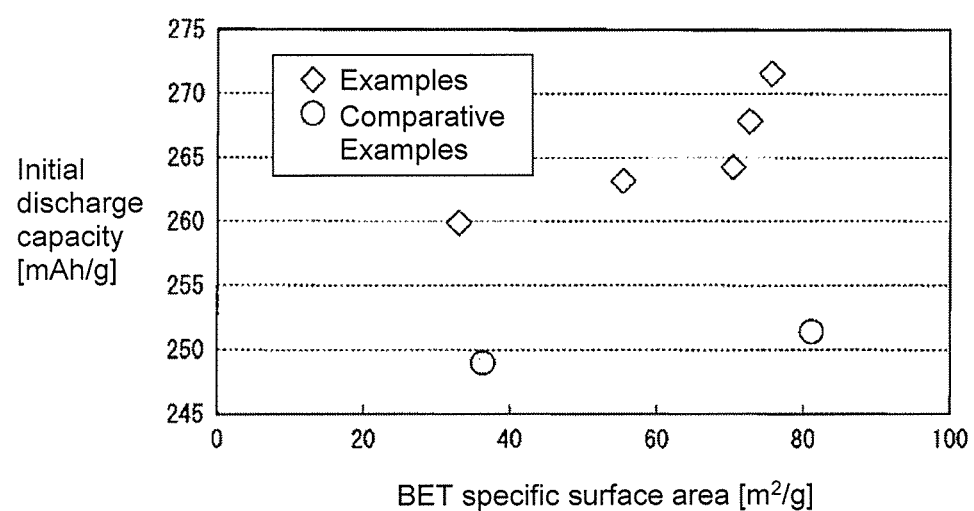
FIG. 5 is a graph illustrating the relation between the BET specific surface area of the transition metal-containing hydroxide in each of Ex. 1 to 7 and the initial discharge capacity of the lithium secondary battery.

The relation between the BET specific surface area of the hydroxide and the initial discharge capacity of the lithium secondary battery is shown in FIG. 5.

As shown in FIGS. 3 and 4, the lithium secondary battery finally obtained by using the hydroxide in each of Examples of the present invention (Ex. 2, 3 and 5 to 7) in which $\{dA/d\ log(D)\}_{D \geq 10\ nm}/\{dA/d\ log(D)\}_{total}$ was at least 23%, had a high initial discharge capacity and a high 1C discharge capacity as compared with the lithium secondary battery finally obtained by using the hydroxide in each of Comparative Examples (Ex. 1 and 4) in which $\{dA/d\ log(D)\}_{D \geq 10\ nm}/\{dA/d\ log(D)\}_{total}$ was less than 23%.

On the other hand, as shown in FIG. 5, even though the BET specific surface area of the hydroxide was large, the initial discharge capacity and the 1C discharge capacity of the lithium secondary battery were not sufficiently high.

INDUSTRIAL APPLICABILITY

According to the transition metal-containing hydroxide of the present invention, by using a lithium-containing composite oxide obtained from the hydroxide as a cathode active material, it is possible to obtain a lithium ion secondary battery excellent in the discharge capacity and cycle characteristics.

The entire disclosure of Japanese Patent Application No. 2016-019043 filed on Feb. 3, 2016 including specification, claims, drawings and summary is incorporated herein by reference in its entirety.

REFERENCE SYMBOLS

10: reactor, 12: stirring device, 14: agitating blade, 16: filter

The invention claimed is:

1. A transition metal-containing hydroxide, which is a precursor of a lithium-containing composite oxide, wherein in a distribution of a logarithmic derivative pore specific surface area relative to pore size, obtained by a Barrett, Joyner, Halenda (BJH) method, a proportion of a sum of the logarithmic derivative pore specific surface areas with pore sizes of 10 nm or larger, to 100% of a sum of the logarithmic derivative pore specific surface areas in an entire distribution, is at least 23% and at most 33.7%;
   wherein the transition metal-containing hydroxide has a BET specific surface area from 55 m²/g to 200 m²/g, and wherein in a distribution of the logarithmic derivative pore specific surface area relative to the pore size, obtained by the BJH method, the sum of the logarithmic derivative pore specific surface areas with pore sizes of 10 nm or larger, is at least 300 m²/g and at most 400 m²/g.

2. The transition metal-containing hydroxide according to claim 1, which is a transition metal-containing hydroxide represented by the following formula (1):

$$Ni_\alpha Co_\beta Mn_\gamma M_\delta(OH)_2 \qquad \text{formula (1)}$$

wherein M is a metal element other than Li, Ni, Co and Mn, $\alpha$ is from 0.15 to 0.5, $\beta$ is from 0 to 0.2, $\gamma$ is from 0.3 to 0.8, $\delta$ is from 0 to 0.1, and $\alpha+\beta+\gamma+\delta=1$.

3. The transition metal-containing hydroxide according to claim 1, wherein $D_{50}$ of the transition metal-containing hydroxide is from 3.5 to 15.5 μm.

4. The transition metal-containing hydroxide according to claim 1, wherein the transition metal-containing hydroxide has a BET specific surface area from 70 m²/g to 100 m²/g.

5. The transition metal-containing hydroxide according to claim 1, wherein $D_{50}$ of the transition metal-containing hydroxide is from 3.5 to 8.0 μm.

6. A method for producing a lithium-containing composite oxide, which comprises a step of mixing the transition metal-containing hydroxide as defined in claim 1 and a lithium compound, and firing the mixture at 900° C. or higher.

* * * * *